(12) United States Patent
Pitsenbarger et al.

(10) Patent No.: US 7,614,659 B2
(45) Date of Patent: Nov. 10, 2009

(54) CHASSIS AND SPRING HANGER FOR A VEHICLE

(75) Inventors: Mark W. Pitsenbarger, Moore, SC (US); Scott A. Watson, Boiling Springs, SC (US)

(73) Assignee: Daimler Trucks North America LLC, Portland, OR (US)

( * ) Notice: Subject to any disclaimer, the term of this patent is extended or adjusted under 35 U.S.C. 154(b) by 191 days.

(21) Appl. No.: 11/929,990

(22) Filed: Oct. 30, 2007

(65) Prior Publication Data

US 2008/0150272 A1    Jun. 26, 2008

Related U.S. Application Data

(60) Provisional application No. 60/855,830, filed on Oct. 31, 2006.

(51) Int. Cl.
B62D 21/11    (2006.01)

(52) U.S. Cl. .................. 280/788; 280/104; 280/781; 280/783; 280/676; 280/678

(58) Field of Classification Search .......... 280/788, 280/781, 783, 676, 678, 104
See application file for complete search history.

(56) References Cited

U.S. PATENT DOCUMENTS

| | | | | |
|---|---|---|---|---|
| 1,422,034 A | * | 7/1922 | Collier | 280/2 |
| 1,432,296 A | * | 10/1922 | Mosel | 280/79.11 |
| 2,142,173 A | * | 1/1939 | Broluska | 280/788 |
| 2,456,719 A | | 12/1948 | Martin | |
| 2,461,867 A | | 2/1949 | Avila | |
| 2,472,813 A | | 6/1949 | Double et al. | |
| 2,554,261 A | * | 5/1951 | Munger | 180/432 |
| 3,204,977 A | | 9/1965 | Eisenhauer et al. | |
| 3,459,436 A | * | 8/1969 | Rusconi | 280/104 |
| 3,481,623 A | * | 12/1969 | Campbell | 280/124.111 |
| 3,486,762 A | * | 12/1969 | Turnbull | 280/104 |
| 3,768,827 A | | 10/1973 | Hickman | |
| 3,830,515 A | | 8/1974 | Wragg | |
| 4,000,914 A | | 1/1977 | Wragg | |
| 4,061,362 A | | 12/1977 | Bufler | |
| 4,563,007 A | | 1/1986 | Bayliss et al. | |
| 4,566,719 A | * | 1/1986 | Van Denberg | 280/124.116 |
| 4,623,162 A | | 11/1986 | Weitzenhof et al. | |
| 5,279,383 A | | 1/1994 | Gustafsson | |
| 5,538,264 A | | 7/1996 | Brown et al. | |
| 5,683,098 A | * | 11/1997 | VanDenberg | 280/124.116 |
| 5,908,198 A | | 6/1999 | VanDenberg | |
| 6,328,322 B1 | * | 12/2001 | Pierce | 280/124.131 |
| 6,871,862 B2 | | 3/2005 | Chalin | |
| 6,986,519 B2 | | 1/2006 | Smith | |
| 7,077,411 B2 | | 7/2006 | Peters et al. | |
| 7,389,844 B2 | * | 6/2008 | Van Der Bijl | 180/291 |
| 2001/0030406 A1 | * | 10/2001 | Pierce | 280/124.116 |
| 2002/0089162 A1 | * | 7/2002 | Horejsi et al. | 280/781 |
| 2003/0111814 A1 | | 6/2003 | Sutton et al. | |
| 2005/0073124 A1 | | 4/2005 | Lundmark | |
| 2005/0253352 A1 | | 11/2005 | Ziech | |
| 2006/0027411 A1 | | 2/2006 | Bordini | |

(Continued)

Primary Examiner—Paul N Dickson
Assistant Examiner—Jordan Golomb
(74) Attorney, Agent, or Firm—Klarquist Sparkman, LLP

(57) ABSTRACT

In one embodiment, a dual purpose spring holder mounting bracket pivotally receives a rear suspension spring arm and also receives a tensioning member extending to a forwardly positioned mounting bracket.

2 Claims, 10 Drawing Sheets

U.S. PATENT DOCUMENTS

2006/0108784 A1* 5/2006 Van Der Bijl ............... 280/800
2006/0249922 A1* 11/2006 Hinz ................... 280/124.116
2007/0001421 A1* 1/2007 Pierce et al. ............. 280/149.2
2008/0252032 A1* 10/2008 Keeler ................. 280/124.116

* cited by examiner

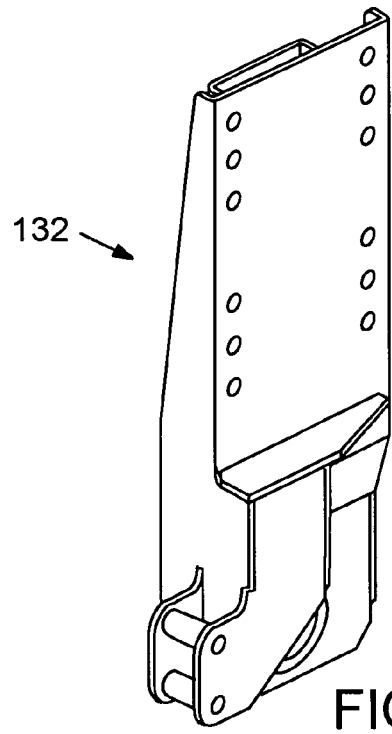
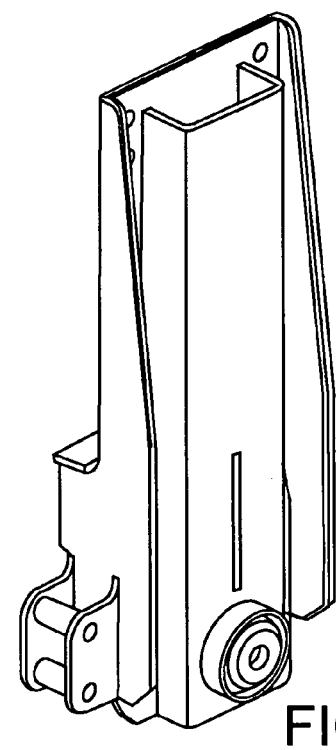
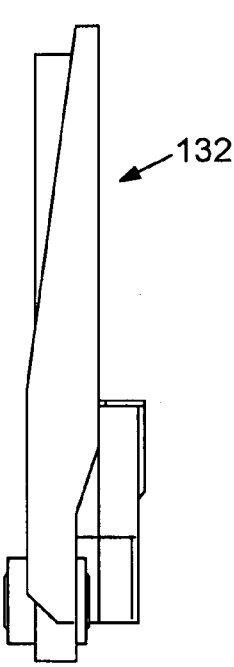
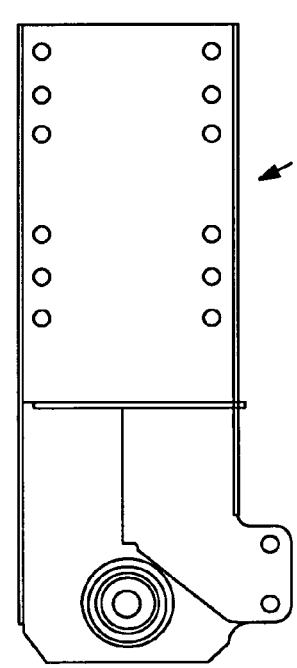
FIG. 11
FIG. 10
FIG. 13
FIG. 12

CHASSIS AND SPRING HANGER FOR A VEHICLE

CROSS-REFERENCE TO RELATED APPLICATION

This application claims the benefit of U.S. Provisional Application No. 60/855,830, entitled "Spring Hanger for a Vehicle", and filed Oct. 31, 2006, which is incorporated herein by reference.

BACKGROUND

Referring to FIGS. 1-4, coach or motor home frames or chassis, such as frame 100, typically have a pair of frame rails, such as frame rails 108, 110, and a front and rear suspension assembly, such as front suspension assembly 120 and rear suspension assembly 130, mounted to each frame rail. Front and rear suspension assemblies 120, 130 each include one or more mounts or brackets coupled to an associated frame rail, one or more movable suspension arms coupled to the mount or mounts, and one or more vibration dampening devices, such as shock absorption and/or piston-type air springs.

For example, front suspension assembly 120 includes a pair of brackets 122 (FIG. 3) each secured to frame rail 110, it being exemplary of frame rail 108, suspension arms 124 coupled to a respective bracket and front axle (not shown), an air spring 126, and a shock absorber (see FIG. 1).

Overview

With reference to FIG. 3, each rear suspension assembly, with rear suspension assembly 130 being exemplary of such assemblies, comprises a mount, e.g., spring hanger bracket 132 and axle support bracket 134, mounted to frame rail 110. The spring hanger bracket 132 and to the axle support bracket 134 are fixed relative to each other. The rear suspension assembly 130 includes a suspension arm, or beam, 136 coupled to the spring hanger bracket 132 at a front end and the axle support bracket 134 at an opposite rear end. The suspension arm 136 is movable, e.g., pivotable, relative to the spring hanger bracket 132. The rear suspension assembly 130 also includes an air spring 138 and a shock absorber 140 mounted to the frame rail 110 at a first ends and a rear axle assembly 139 (FIG. 1), which includes rear wheels 141. The rear axle assembly 139 is movable relative to the spring hanger bracket 132 (FIG. 3) and axle support bracket 134 such that as the wheels travel over uneven surfaces, the air springs and shock absorbers expand and contract to dampen the vibrational effects caused by travel over such surfaces.

The expansion and contraction of the vibration dampening devices allows the suspension arm 136 to pivot about attachment point 142. The components of the rear suspension assembly 130 can be selected and calibrated to provide desirable vibration dampening characteristics. For example, the length of the spring hanger bracket 132 and the location of the attachment points 142 can be predetermined to provide desirable and specific vibration dampening characteristics. As one example, the length X (FIG. 7) of the spring hanger from the bottom of the lower frame rail to the beam pivot at 142 can be 11.35 inches, and the lengths Y and Z from the bottom of the frame rail to connection points for the tensioning member can, for example, respectively, be 8.51 inches and 11.51 inches. These dimensions can be varied.

Although not particularly shown, most motor homes or coaches include one or more storage compartments located below the frame rails and between the front and rear assemblies. The storage compartments can be used for storing any of various items, such as, for example, luggage, electrical equipment, generators and water pumps.

Typically, storage compartments are supported by at least two tension members, such as tension member 150 (FIGS. 1-4), each mounted to one of the two frame rails, such as frame rail 110, in a spaced apart manner relative to each other and the frame rails such that the compartments occupy a space 153 (FIG. 2) defined generally between the frame rails and tension members (see FIG. 3). Tension member 150 can be any of various elongate members configured to support a predetermined weight. For example, in some implementations, tension member 150 includes a bar 151, such as a hollow or solid bar, having any of various cross-sectional shapes, such as circular or rectangular, and be made of any of various strong and durable materials, such as a steel alloy.

With conventional motor home frames, the front ends of each of the tension members are mounted in a spaced apart relationship relative to the frame rails via front and rear mounting brackets attached directly to the frame rails and extending downwardly generally transversely from the frame rails. For example, each frame rail includes a front mounting bracket, such as front mounting bracket 160 positioned nearer the front wheel assembly and a rear mounting bracket (not shown) similar to mounting bracket 160 positioned nearer, but forwardly of, the rear suspension assembly. A front end of each tension member is attached to a respective front mounting bracket and a rear end of each tension member is attached to a respective rear mounting bracket. In conventional coach chassis, both the front and rear tension member mounting brackets are mounted to the frame rails independent of the front and rear suspension assemblies.

The weight of the various items stored in the storage compartments places the tension members in tension and urges the ends of the tension members inwardly toward each other. The greater the overall weight of the items, the greater the inward draw of the ends of the tension members on the mounting brackets. Accordingly, the tension members are mounted to mounting brackets independent of the front and rear suspension assemblies so that the tensioning of the tension member does not affect the calibration of the suspension assemblies.

BRIEF DESCRIPTION OF THE DRAWINGS

FIG. 10 is a perspective view looking toward a front side of an exemplary view of a rear mounting bracket.

FIG. 11 is a perspective view looking toward the back side of the rear mounting bracket of FIG. 12.

FIG. 12 is a view of the back side of the mounting bracket of FIG. 11.

FIG. 13 is a side view of the mounting bracket of FIG. 10 looking toward the rear side of the mounting bracket.

SUMMARY

Figure 1:
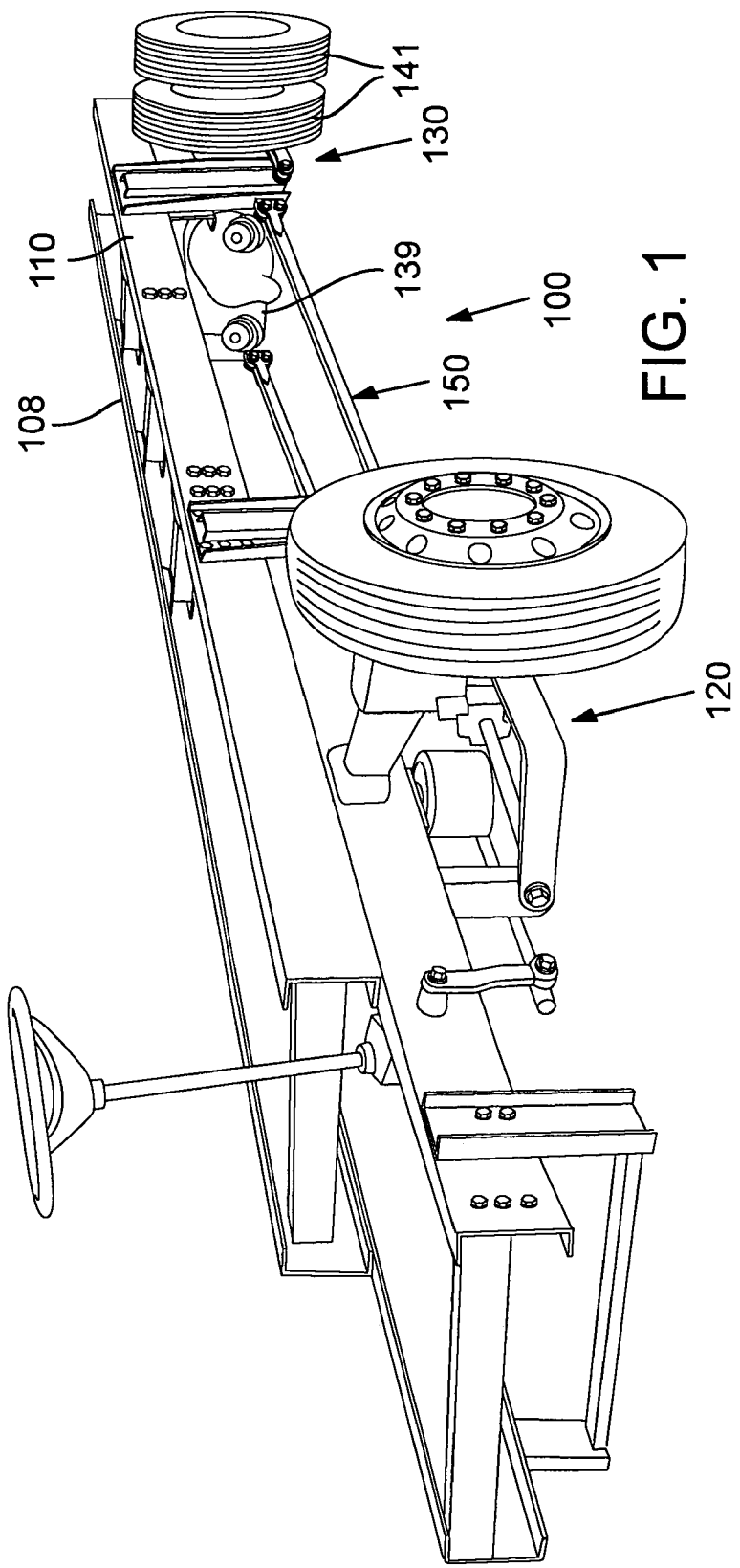
FIG. 1 is a perspective view of one embodiment of a chassis.
Figure 2:
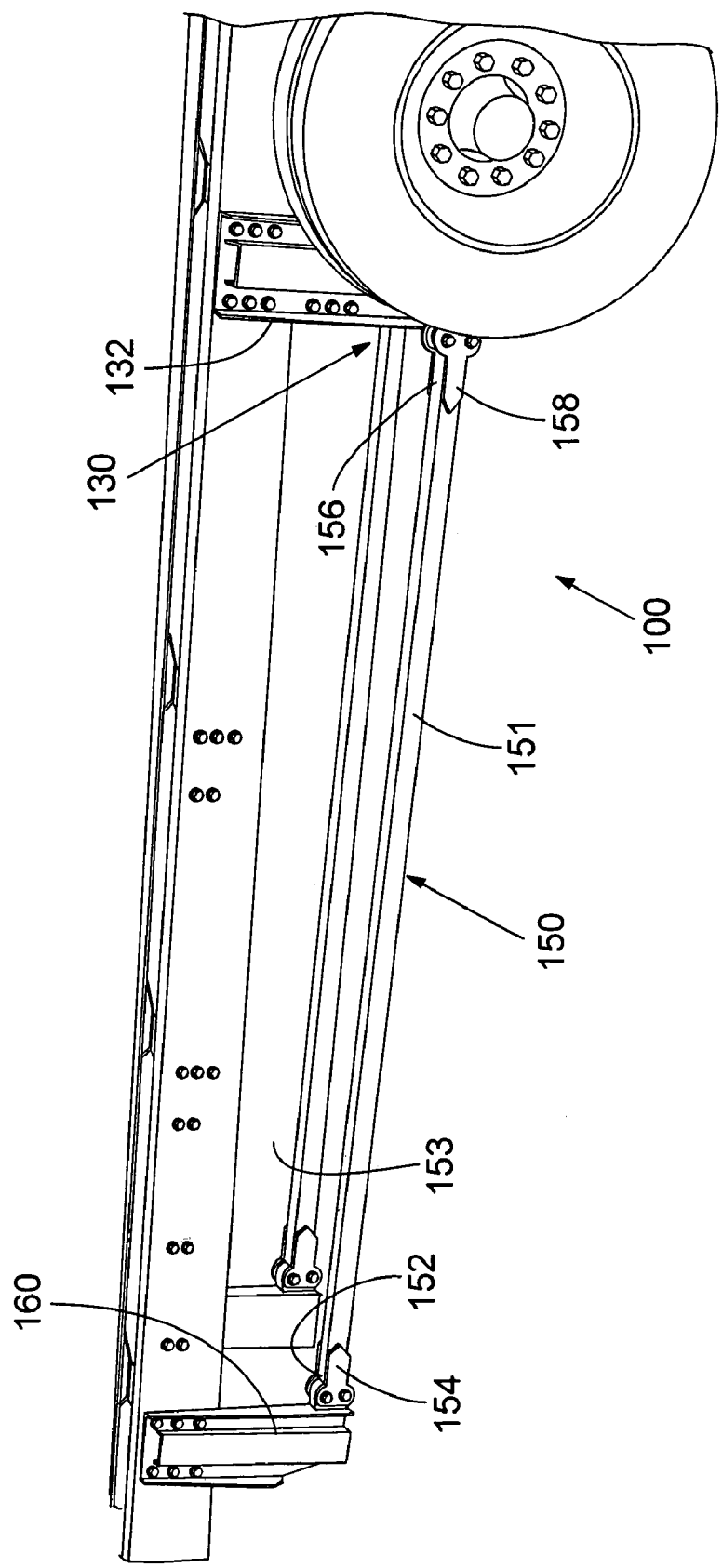
FIG. 2 is a side perspective view of the chassis of FIG. 1.

By way of example, according to one specific embodiment, a chassis for a vehicle, such as a motor home, can comprise dual function spring mounting brackets, each one coupled to an associated frame rail adjacent to, but forwardly of the rear axle of the vehicle. Each spring mounting bracket supports a portion of an associated rear suspension (e.g., a suspension beam) and provides a mounting location for the rear end of a forwardly extending tensioning rod or member. A tensioning member mounting bracket can be supported by each spring mounting bracket at the mounting location.

In some implementations, the tensioning member can support a storage compartment of the vehicle located below the frame rails of the vehicle chassis.

The foregoing and other features and advantages will become more apparent from the following detailed description.

DETAILED DESCRIPTION

According to one embodiment, rather than being attached to a front mounting bracket and a rear mounting bracket separate from the rear suspension assembly, tensions members, such as tension member 150, are attached to a front mounting bracket 160 at a front end 152 and mounted directly to the spring hanger bracket 132 of the rear suspension assembly 130 at a rear end 156. The rear suspension assembly 130 can be calibrated to include the tensioning effects of the tension member 150 when under any of various loads, such that the performance, e.g., vibration dampening characteristics, of the rear suspension assembly is not adversely affected by the loading or unloading of the storage compartments.

Figure 3:
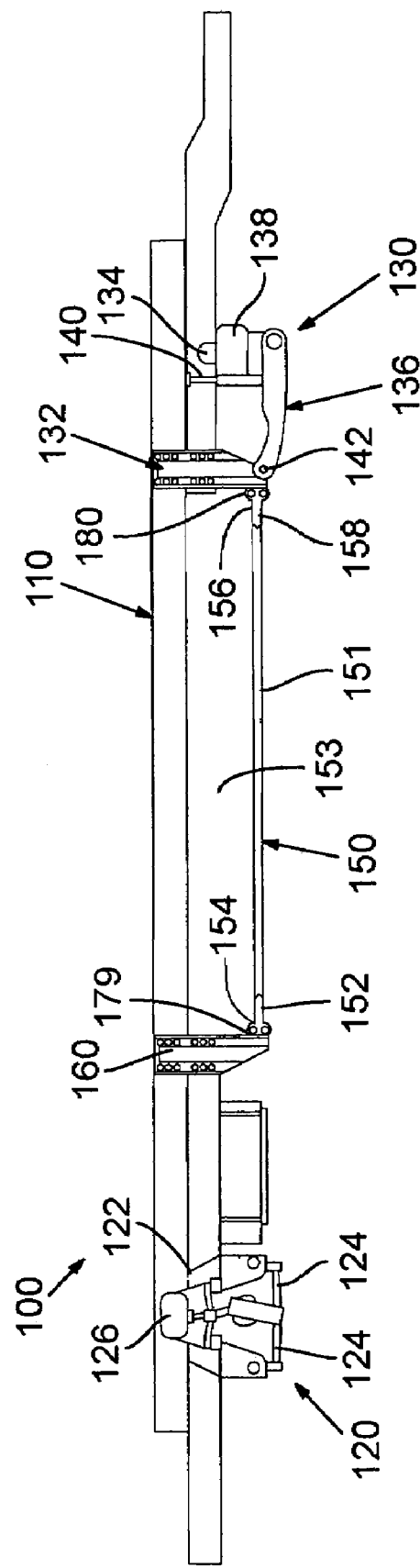
FIG. 3 is a side elevational view of a portion of a chassis showing exemplary front and rear mounting brackets, an exemplary tensioning member extending therebetween and an exemplary rear suspension assembly with an arm pivoted to the rear mounting bracket.
Figure 4:
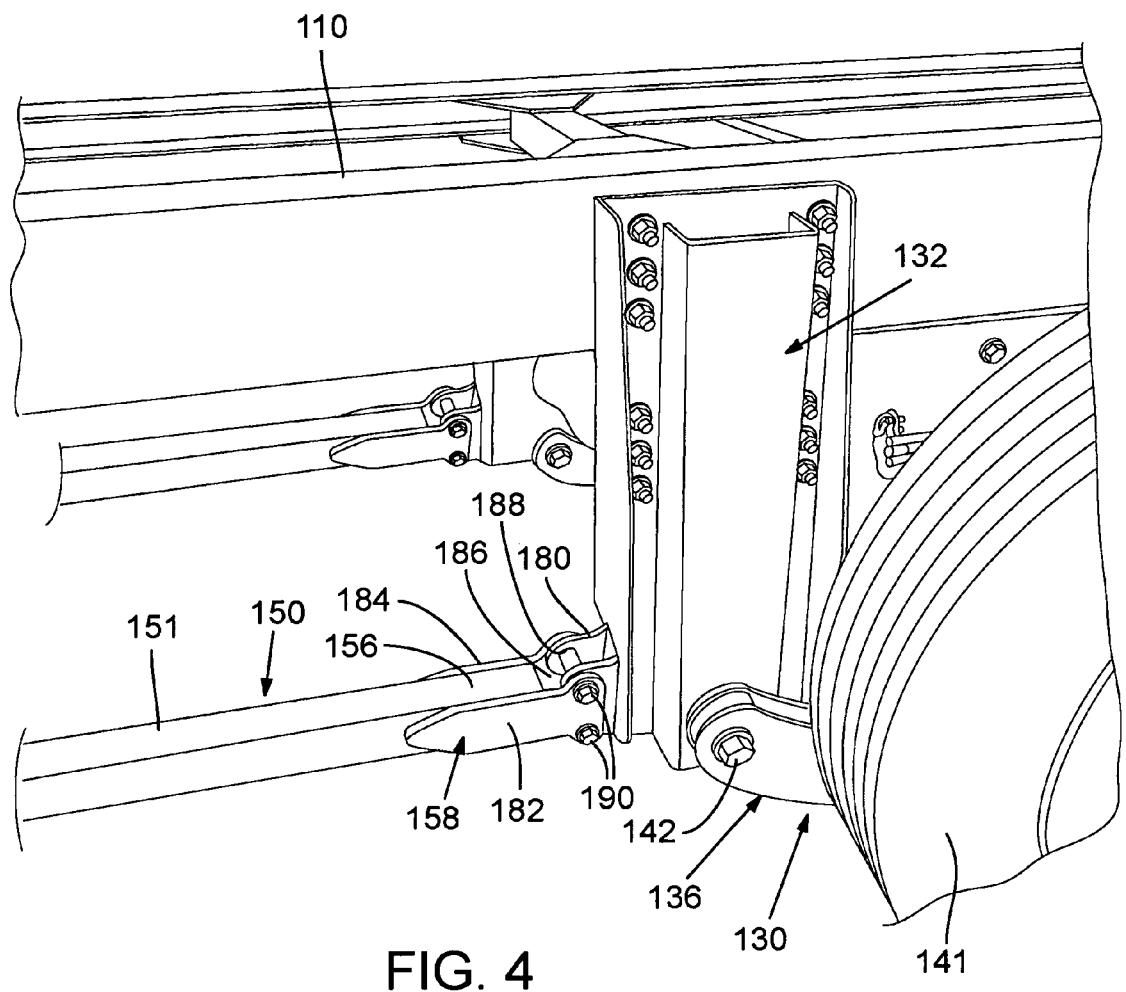
FIG. 4 is a perspective view of a portion of an exemplary rear mounting bracket.
Figure 5:
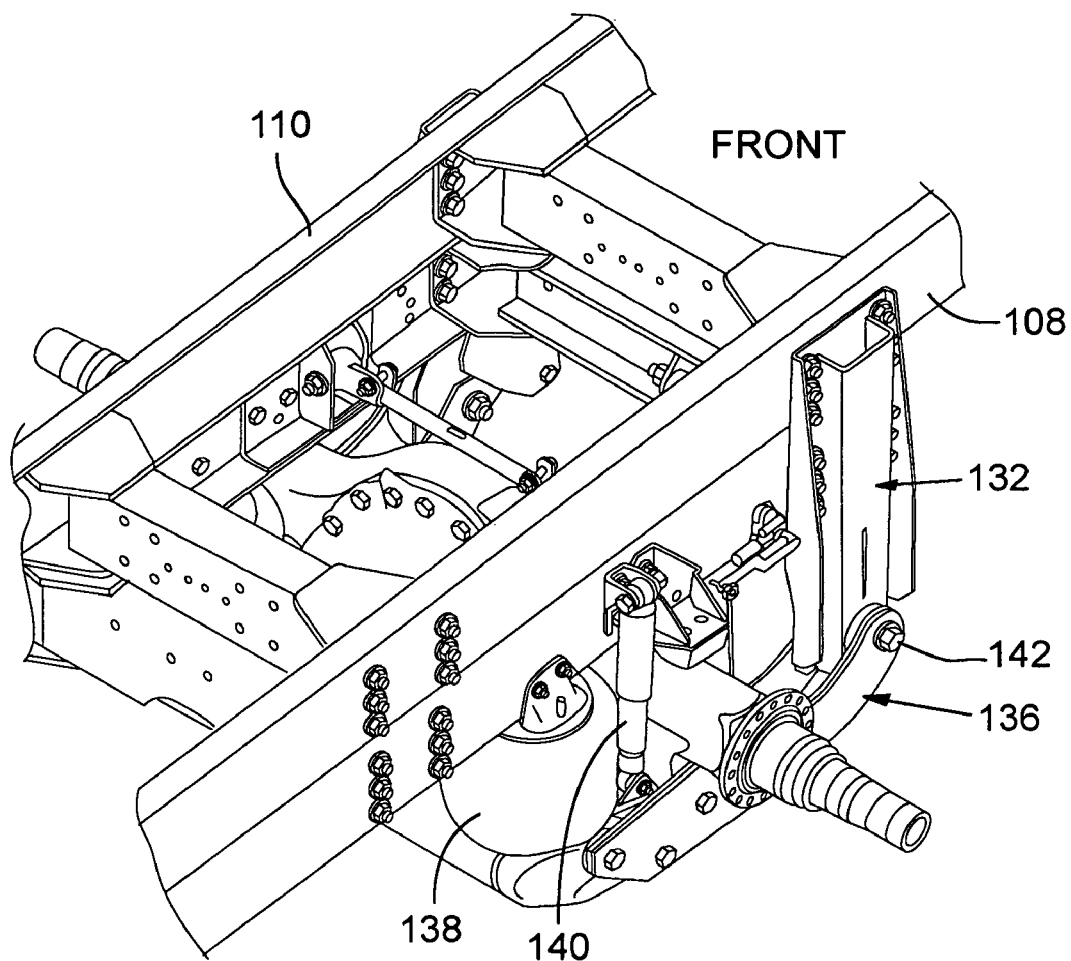
FIG. 5 is a perspective view of an exemplary rear suspension comprising an embodiment of a spring hanger.
Figure 6:
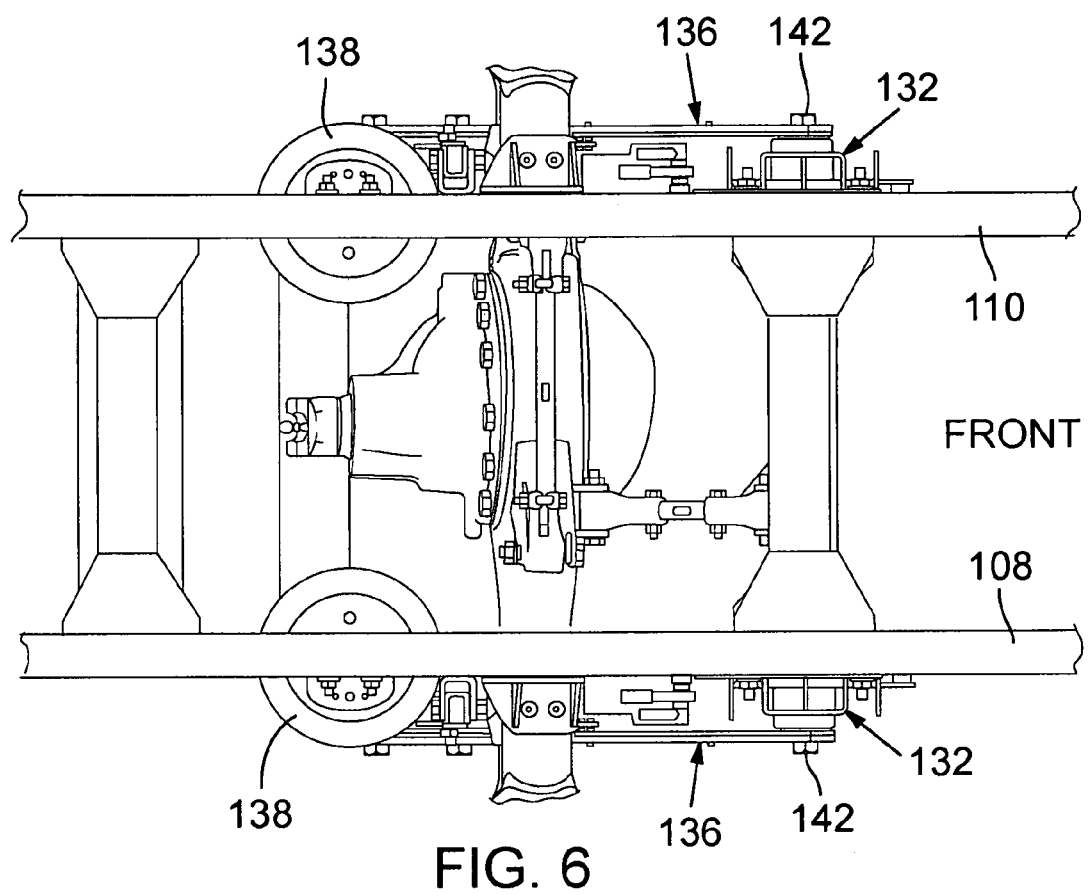
FIG. 6 is a top view of the rear suspension of FIG. 5.
Figure 7:
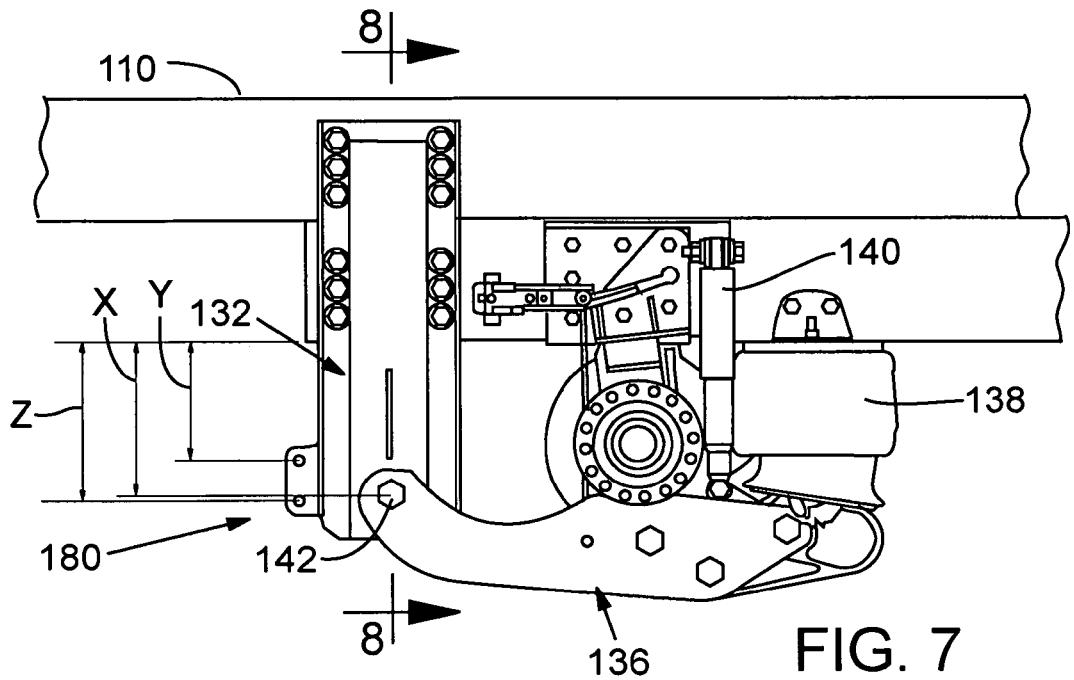
FIG. 7 is a side view of the suspension of FIG. 5.
Figure 8:
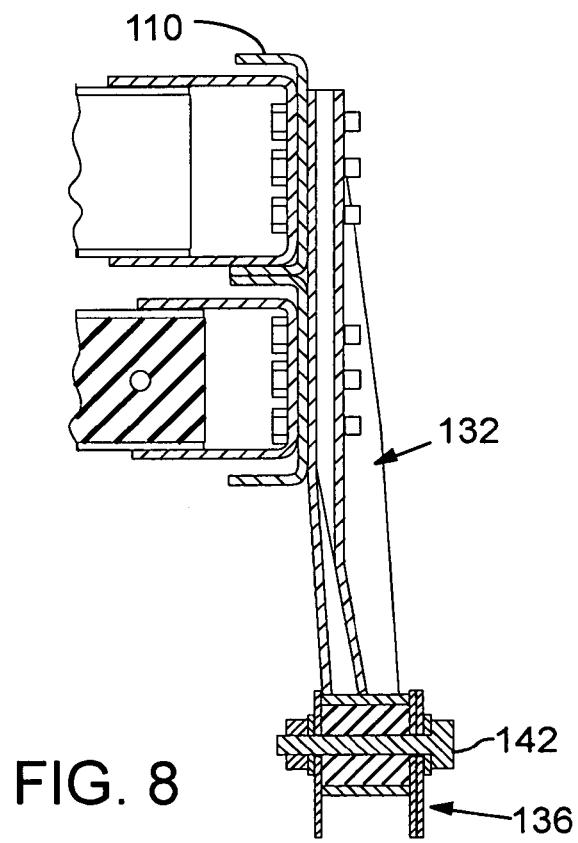
FIG. 8 is a vertical sectional view taken along lines 8-8 of FIG. 7.
Figure 9:
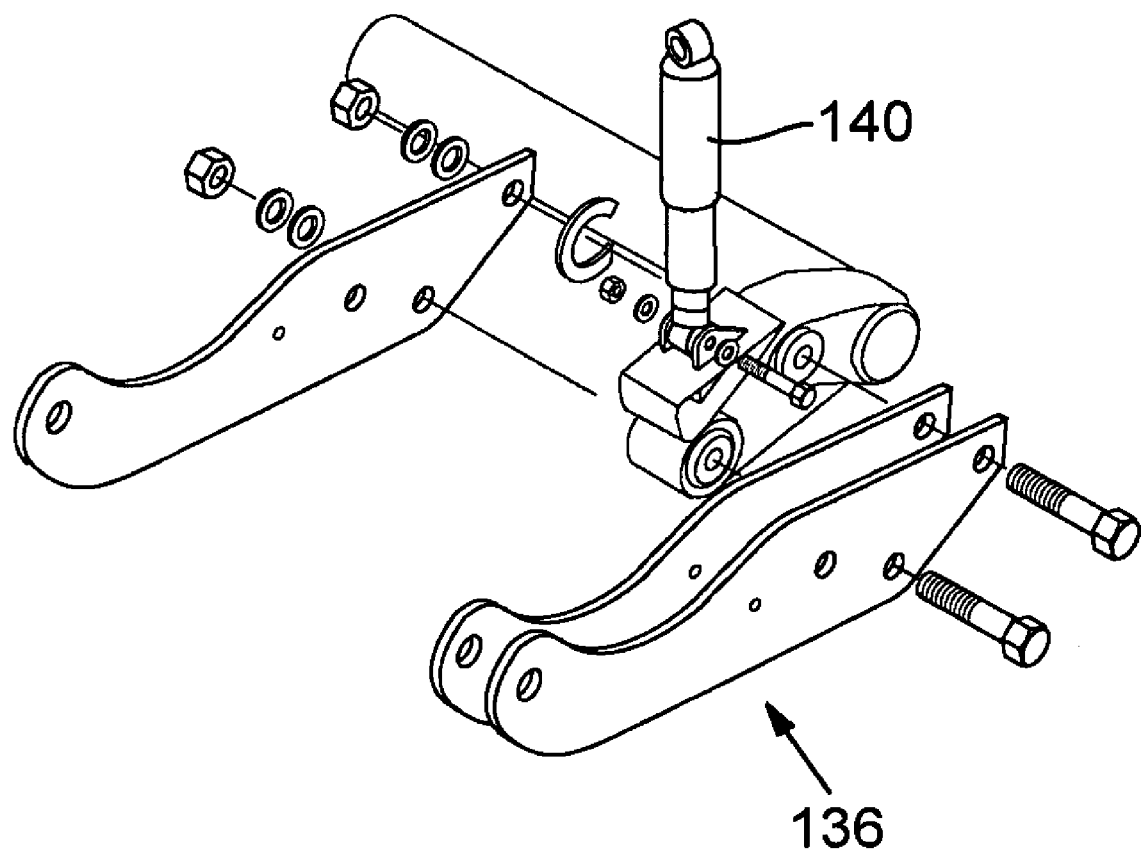
FIG. 9 is a partially exploded view of an exemplary portion of the suspension of FIG. 5.
Figure 15:
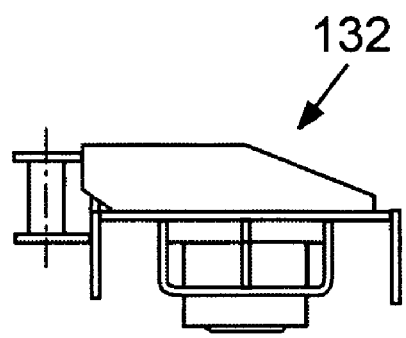
FIG. 15 is a top view of the mounting bracket of FIG. 14.
Figure 14:
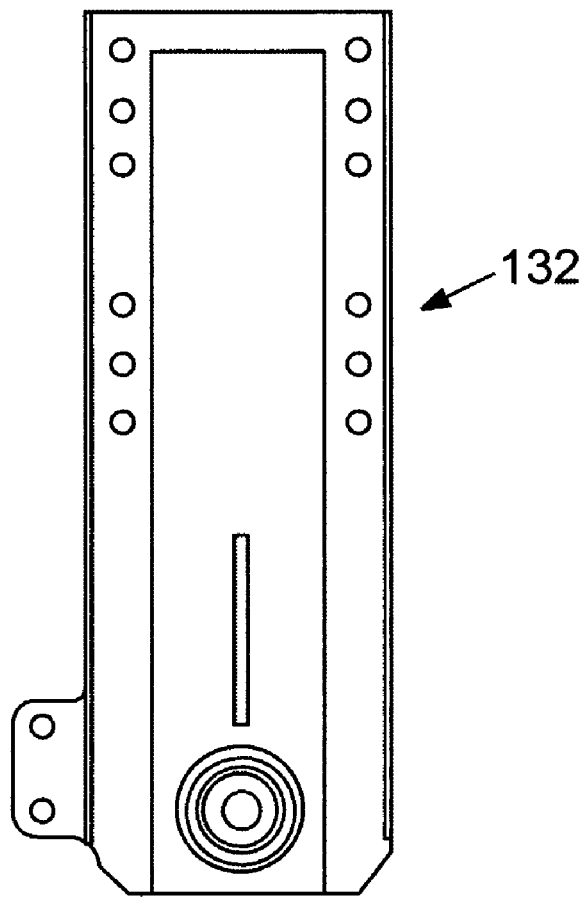
FIG. 14 is a view of the front side of the mounting bracket of FIG. 11.

In one specific implementation, the first end 152 of tension member 150 comprises a first bracket coupling portion 154 and the rear end 156 of tension member 150 comprises a second bracket coupling portion 158. The first and second bracket coupling portions 154, 158 are configured to matingly engage tension member mounts 179, 180 (FIG. 3, FIG. 4) secured to the front mounting bracket 160 and spring hanger bracket 132, respectively. As shown in FIGS. 3 and 4, in some embodiments, the tension member mount 180 is secured to the spring hanger bracket 132 at a location adjacent the suspension arm attachment point 142, such as at approximately the same distance away from the frame rail 110.

As shown in more detail in FIG. 4, bracket coupling portion 158, being exemplary of bracket coupling portion 154, includes a pair of spaced apart attachment plates 182, 184 secured, such as by welding, to the tension member bar 151 proximate the rear end 156 of tension member 150. The plates 182, 184 can include apertures 186 that are alignable with apertures 188 formed in the tension member mount 180, which is exemplary of tension member mount 179. A fastener element, such as nut and bolt combination 190, can extend through the apertures 186, 188 and be tightened to secure the second bracket coupling portion 158, and thus the rear end 156 of the tension member 150, to the tension member mount 180, thereby coupling the tension member to the spring hanger bracket 132.

Although the coupling portions shown include separate attachment plates secured to the tension member bar, in other implementations, the coupling portions can include attachment elements, such as tabs, integrally formed with the tension member bar. In some embodiments, the coupling portions and tension member mounts can be any of various mateable coupling elements attachable to each other using any of various conventional coupling techniques.

According to some implementations, attaching the tension members directly to the spring hanger brackets provides certain advantages. For example, by integrating the function of a second pair of mounting brackets into the spring hanger brackets, a separate pair of mounting brackets is not required to mount the tension members. As a result, fewer parts require assembly, thus the chassis can be manufactured more quickly and easily, and at a lower cost.

Since spring hanger brackets, such as spring hanger bracket 132, are typically larger, stronger, and more robust than tension member mounting brackets, such as bracket 160, the attachment point between the second end of the tension members and the frame is more robust than conventional attachment points. Also, mounting the tension members directly to the rear suspension assembly creates additional space below the frame rails for increasing the size and capacity of the storage compartments.

FIGS. 5-15 illustrate an embodiment in greater detail with components that are similar to the components of FIGS. 1-4 being assigned the same numbers.

In view of the many possible embodiments to which the principles of the disclosed spring hanger bracket may be applied, it should be recognized that the illustrated embodiments are only examples and should not be taken as limiting the scope of the disclosure. We claim as our invention all variations that fall within the scope of the following claims.

We claim:
1. A vehicle chassis comprising:
first and second spaced apart frame rails, each frame rail comprising a front portion and a rear portion;
a front axle;
a front suspension coupling the front axle to the front portions of each of the first and second frame rails;
a rear axle;
a rear suspension coupling the rear axle to a rear portion of each of the first and second frame rails;
the rear suspension comprising a first rear axle suspension assembly coupling the rear axle to the first frame rail and a second rear axle suspension assembly coupling the rear axle to the second frame rail;
each of the first and second rear axle suspension assemblies comprising a rear suspension mounting bracket extending downwardly from the associated frame rail at a location forwardly the rear axle, a support arm coupled to the axle with a forward end portion pivoted to the mounting bracket at a location below the associated frame rail, and an air spring coupling the rear axle to the associated frame rail;
a first forward mounting bracket coupled to the first rail at a location rearwardly of the front axle and extending downwardly below the first frame rail;
a second forward mounting bracket coupled to the second frame rail at a location rearwardly of the front axle and extending downwardly below the second frame rail;
a first tensioning member extending from the rear suspension mounting bracket associated with the first frame rail to the first forward mounting bracket; and a second tensioning member extending from the rear suspension mounting bracket associated with the second frame rail to the second forward mounting bracket.

2. A vehicle suspension according to claim 1 wherein each of the first and second frame rails comprises a center rail portion having front and rear end portions, a front rail portion having a rear portion positioned below and overlapped by the front portion of the center rail portion and a rear rail portion having a front portion positioned below and overlapped by the rear portion of the center rail portion, the first forward mounting bracket being connected to each of the front and center rail portions of the first frame rail where they overlap, the second forward mounting bracket being connected to each of the front and center rail portions where they overlap, the rear suspension mounting bracket associated with the first frame rail being connected to each of the rear and center rail portions of the first frame rail where they overlap, and the rear suspension mounting bracket associated with the second frame rail being connected to each of the rear and center rail portions of the second frame rail where they overlap, the first and second tensioning members being located at an elevation below the bottom of the front and rear rail portions.

* * * * *